(12) United States Patent
Kim

(10) Patent No.: US 8,746,945 B2
(45) Date of Patent: Jun. 10, 2014

(54) BACKLIGHT UNIT AND DISPLAY DEVICE HAVING THE SAME

(75) Inventor: Jong Wook Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 553 days.

(21) Appl. No.: 13/078,393

(22) Filed: Apr. 1, 2011

(65) Prior Publication Data

US 2011/0292679 A1 Dec. 1, 2011

(30) Foreign Application Priority Data

May 28, 2010 (KR) .................. 10-2010-0050171

(51) Int. Cl.
*F21V 7/04* (2006.01)

(52) U.S. Cl.
USPC ......... 362/609; 362/97.1; 362/97.2; 362/97.3

(58) Field of Classification Search
USPC ................. 362/613, 97.1–97.3, 609
See application file for complete search history.

(56) References Cited

U.S. PATENT DOCUMENTS

| | | | |
|---|---|---|---|
| 5,128,842 A | 7/1992 | Kenmochi | |
| 8,113,705 B2 * | 2/2012 | Kim et al. | 362/620 |
| 2003/0095407 A1 | 5/2003 | Yao | |
| 2005/0041173 A1 | 2/2005 | Kubota et al. | |
| 2006/0268576 A1 * | 11/2006 | Matsui et al. | 362/613 |
| 2008/0007970 A1 | 1/2008 | Lee et al. | |
| 2010/0027241 A1 | 2/2010 | Nakanishi | |
| 2010/0110329 A1 | 5/2010 | Kubota et al. | |

FOREIGN PATENT DOCUMENTS

| | | |
|---|---|---|
| CN | 1421727 A | 6/2003 |
| CN | 1949048 A | 4/2007 |
| CN | 101556008 A | 10/2009 |
| CN | 101681048 A | 3/2010 |
| DE | 8602774.3 U1 | 3/1986 |
| FR | 1580461 A | 9/1989 |
| JP | 58-146289 U | 10/1983 |
| JP | 7-159620 A | 6/1995 |
| JP | 8-202300 A | 8/1996 |
| JP | 2003-156610 A | 6/2003 |
| JP | 2004-54041 A | 2/2004 |
| JP | 2004-534352 A | 11/2004 |
| JP | 2005-43832 A | 2/2005 |
| JP | 2005-258052 A | 9/2005 |
| JP | 2006-215475 A | 8/2006 |
| JP | 2010-107753 A | 5/2010 |
| KR | 20-0384891 Y1 | 5/2005 |
| KR | 10-2008-0004134 A | 1/2008 |
| KR | 10-0626581 B1 | 4/2008 |
| KR | 10-2010-0014113 A | 2/2010 |
| KR | 10-2010-0037493 A | 4/2010 |

* cited by examiner

*Primary Examiner* — Anabel Ton
(74) *Attorney, Agent, or Firm* — Birch, Stewart, Kolasch & Birch, LLP

(57) ABSTRACT

A backlight unit is disclosed. The backlight unit includes a light emitting device module, a reflective plate including at least two slopes configured to reflect light emitted from the light emitting device module to an optical member, and the optical member to transmit the light directed from the light emitting device module and the reflective plate. The slope located farther from the light emitting device module has a greater gradient with respect to a horizontal plane than the slope located closer to the light emitting device module.

20 Claims, 7 Drawing Sheets

BACKLIGHT UNIT AND DISPLAY DEVICE HAVING THE SAME

This application claims the benefit of Korean Patent Application No. 10-2010-0050171, filed on May, 28, 2010, which is hereby incorporated by reference as if fully set forth herein.

BACKGROUND

The embodiment relates to a backlight unit having light emitting devices and a display device including the same.

Light emitting devices, such as light emitting diodes or laser diodes using group III-V or II-VI compound semiconductor materials, produce light of various colors, such as red, green, blue, and ultraviolet light, due to development of thin film growth techniques and element materials, and also produce even white light having high efficiency using fluorescent materials or through color mixing. Further, the light emitting devices have advantages, such as low power consumption, semi-permanent lifespan, fast response time, safety, and environmentally friendly properties as compared to conventional light sources, such as fluorescent lamps and incandescent lamps.

Therefore, these light emitting devices are increasingly applied to transmission modules of optical communication units, light emitting diode backlights as a replacement for Cold Cathode Fluorescent Lamps (CCFLs) constituting backlights of Liquid Crystal Display (LCD) devices, lighting apparatuses using white light emitting diodes as a replacement for fluorescent lamps or incandescent lamps, headlights for vehicles and traffic lights.

SUMMARY

Accordingly, the embodiment is directed to a backlight unit and a display device having the same that substantially obviate one or more problems due to limitations and disadvantages of the related art.

The embodiment is to provide a display device with an extremely slim design and enhanced brightness.

Additional advantages and features of the invention will be set forth in part in the description which follows and in part will become apparent to those having ordinary skill in the art upon examination of the following or may be learned from practice of the invention. The other advantages of the invention may be realized and attained by the structure particularly pointed out in the written description and claims hereof as well as the appended drawings.

To achieve other advantages and in accordance with the purpose of the invention, as embodied and broadly described herein, a backlight unit includes a light emitting device module, a reflective plate including at least two slopes configured to reflect light emitted from the light emitting device module to an optical member, and the optical member configured to transmit the light directed from the light emitting device module and the reflective plate, wherein the slope located farther from the light emitting device module has a greater gradient with respect to a horizontal plane than that of the slope located closer to the light emitting device module.

The light emitting device module may be arranged in a single line form.

The gradients of the respective slopes with respect to the horizontal plane may increase with increasing distance from the light emitting device module.

The slope located farthest from the light emitting device module may have a greater height than the slope located closest to the light emitting device module.

The heights of the respective slopes may increase with increasing distance from the light emitting device module.

The light emitting device module may include a pair of light emitting device arrays facing each other.

The at least two slopes may be symmetrical with respect to a center axis between the pair of light emitting device arrays.

The gradients of the slopes may be in a range of 40 to 50 degrees with respect to the horizontal plane.

A reflective material may be formed to surfaces of the slopes.

The reflective material may be aluminum or silver.

The aluminum or silver may be formed to a bottom surface of the reflective plate including the slopes.

The slopes may be provided at a surface thereof with a pattern to scatter light from the light emitting device module.

The backlight unit may further include a light guide plate to guide the light reflected from the reflective plate.

In accordance with another aspect of the embodiment, a backlight unit includes four edge type light emitting device modules, and a reflective plate configured to reflect light emitted from the light emitting device modules, wherein the reflective plate includes at least two slopes placed respectively on coaxial rectangles, the two slopes having different lengths.

The rectangles may have rounded corners.

The slopes may increase in height with increasing distance from a closest one of the four light emitting device modules.

The slopes may increase in gradient with respect to the horizontal plane with increasing distance from a closest one of the four light emitting device modules.

In accordance with a further aspect of the embodiment, a display device includes a backlight unit including a light emitting device module, a reflective plate configured to reflect light emitted from the light emitting device module and a frame in which the light emitting device module and the reflective plate are received, the reflective plate having at least two slopes, the slope located farthest from the light emitting device module having a greater gradient with respect to a horizontal plane than the slope located closest to the light emitting device module, a light guide plate configured to transmit the light directed from the backlight unit to a panel, and the panel placed on the light guide plate and serving to form an image upon receiving the transmitted light.

The light emitting device module may include a pair of light emitting device arrays facing each other, and the at least two slopes may be symmetrical with respect to a center axis between the pair of light emitting device arrays.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
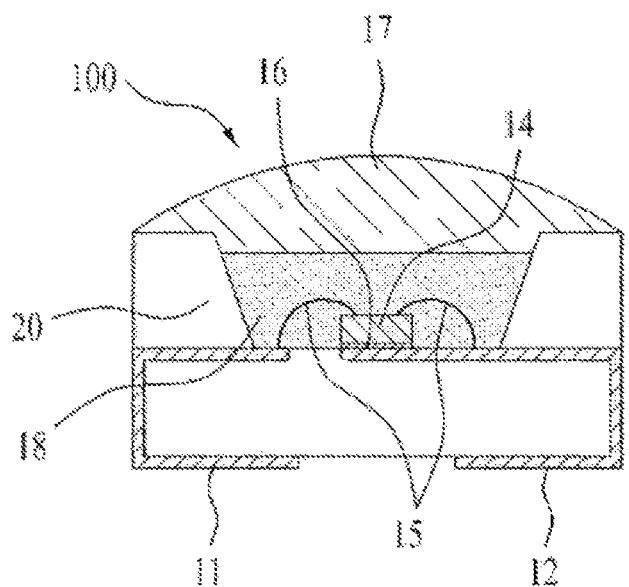
FIG. 1 is a view illustrating an embodiment of a light emitting device package.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device and a method of manufacturing the same according to the embodiment will be described with reference to accompanying drawings.

FIG. 1 is a view illustrating an embodiment of a light emitting device package.

As illustrated in FIG. 1, the light emitting device package 100 includes a light emitting device 14 provided on a package body 20. The light emitting device 14 is electrically connected to first and second electrodes 11 and 12 provided on the package body 20.

Here, the light emitting device 14 may be a light emitting diode in which nitride semiconductors including a p-type semiconductor layer, an active layer and an n-type semiconductor layer are stacked one above another on a substrate.

The light emitting device 14 may be fixed to the package body 20 through a bonding layer 16. Although not illustrated, a heat dissipating pad may be provided to absorb and dissipate heat emitted from the light emitting device 14.

The package body 20 may be made of a silicone material, a synthetic resin material or a metallic material. A slope is formed around the light emitting device 14, thus serving to improve light extraction efficiency.

The light emitting device 14 may be electrically connected to the first and second electrodes 11 and 12 by either flip chips or die bonding, in addition to using bonding wires 15 as illustrated.

The first electrode 11 and the second electrode 12 are electrically isolated of each other and serve to apply power to the light emitting device 14. In addition, the first electrode 11 and the second electrode 12 may function to reflect light emitted from the light emitting device 14 so as to increase illumination efficiency and also, may function to dissipate heat generated from the light emitting device 14.

A resin layer 18 may be provided to surround the light emitting device 14, thus serving to protect the light emitting device 14. The resin layer 18 contains a fluorescent substance so as to change the wavelength of light emitted from the light emitting device 14.

The light emitting device package 100 further includes a lens 17. The lens 17 may be placed on or surround the resin layer 18, or may be formed on the package body 20 so as to cover the package body 20. The lens 17 may serve to change a path of light emitted from the light emitting device 14. The lens 17 may be omitted as occasion demands.

Figure 2:
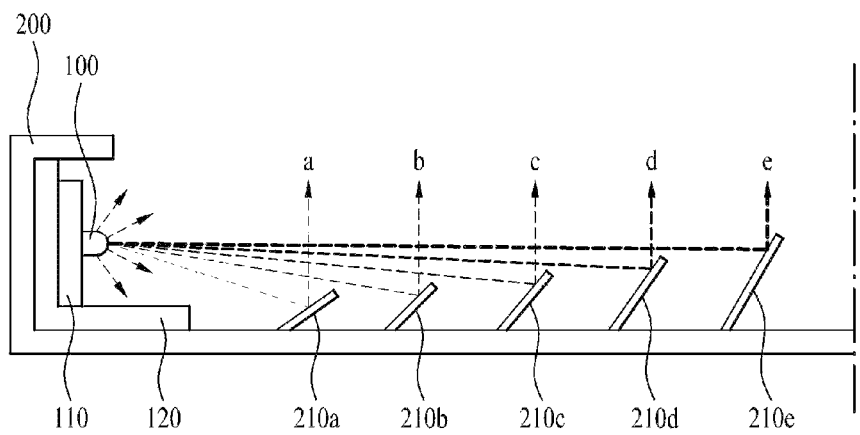
FIG. 2 is a sectional view illustrating a light emitting device module and a reflective plate of a backlight unit according to a first embodiment.
Figure 3:
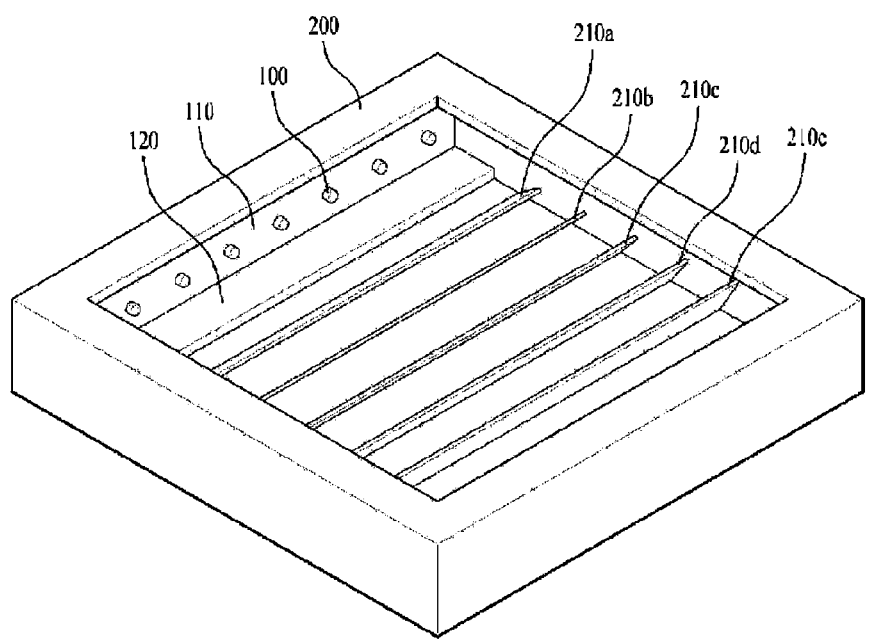
FIG. 3 is a perspective view of FIG. 2.
Figure 4:
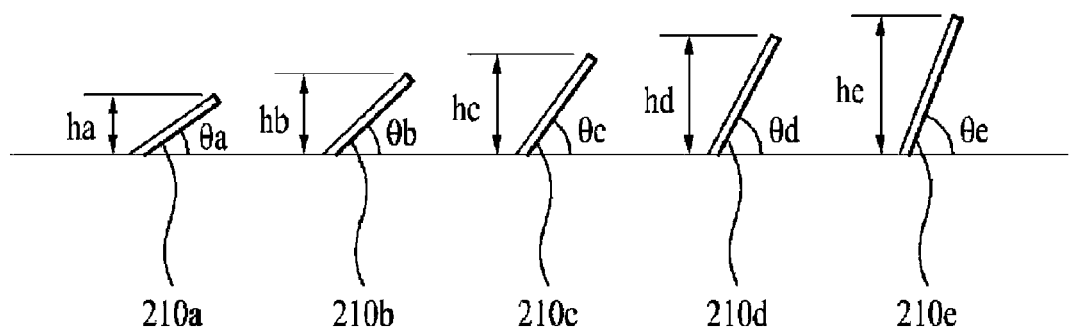
FIG. 4 is a detailed view of the reflective plate illustrated in FIG. 2.

FIG. 2 is a sectional view illustrating a light emitting device module and a reflective plate of a backlight unit according to a first embodiment, FIG. 3 is a perspective view of FIG. 2, and FIG. 4 is a detailed view of slopes illustrated in FIG. 2. Hereinafter, the backlight unit according to the first embodiment will be described in detail with reference to FIGS. 2 to 4.

As illustrated, an array of light emitting device packages 100 is mounted on a printed circuit board 110. In turn, the printed circuit board 110, on which the array of light emitting device packages 100 is mounted, is bonded to a first surface of a bracket 120, the bracket 120 has a shape of L. Hereinafter, a combination of the bracket 120, the printed circuit board 110 and the array of light emitting device packages 100 will be referred to as a light emitting device module.

The light emitting device module is fixed to one side surface of a frame 200. Although not illustrated, a heat transfer member may be provided on the frame 200 so as to come into contact with the bracket 120.

Here, the frame 200 may be made of high-strength metal, and for example, may be made of stainless steel having high corrosion resistance. With the trend towards increasingly slim backlight units, a thickness of the frame 200 may be in a range of 0.1~0.2 mm. In addition, the size of the frame 200 may be changed according to the size of a screen of a display device, such as a liquid crystal display usable with the backlight unit. In consideration of the screen of the display device, the frame 200 may have a rectangular shape.

A reflective plate may be provided on the frame 200 and may serve to reflect light emitted from the light emitting device module so as to change the path of light. The reflective plate may include at least two slopes, for example, five slopes 210a, 210b, 210c, 210d and 210e. The plurality of slopes 210a, 210b, 210c, 210d and 210e may change the path of light emitted from the light emitting device module to paths a, b, c, d and e respectively.

The slopes 210a, 210b, 210c, 210d and 210e may have preset gradients with respect to a horizontal plane and serve to reflect light upward with respect to FIG. 2, i.e. toward a liquid crystal panel. Although FIG. 2 illustrates five slopes, a greater number of slopes may actually be provided to enhance brightness and prevent bright spots due to concentration of light.

In addition, the plurality of slopes 210a, 210b, 210c, 210d and 210e may increase in height with increasing distance from the light emitting device module, such that the slope farthest from the light emitting device module has a greater height than the slope closest to the light emitting device module.

More specifically, as illustrated in FIG. 4, the greater the distance from the light emitting device module, the greater the heights ha, hb, hc, hd and he of the respective slopes 210a, 210b, 210c, 210d and 210e. Accordingly, the slope farthest from the light emitting device module can even reflect light that was not reflected by the slope closest to the light emitting device module.

It should be noted that the above-described light reflection effect can be achieved even when the slopes 210a, 210b, 210c, 210d and 210e have a constant gradient. In addition, as illustrated, the gradients θa, θb, θc, θd and θe of the respective slopes 210a, 210b, 210c, 210d and 210e increase with increasing distance from the light emitting device module. That is, the slope farthest from the light emitting device module has a greater gradient with respect to a horizontal plane than the slope closest to the light emitting device module.

More specifically, as the distance from the light emitting device module increases, the quantity of light incident upon the respective slopes decreases and the slopes tend to reflect light toward the center rather than the perimeter of the panel. This is the reason why the gradient of the slopes increases with increasing distance from the light emitting device module. However, it should be noted that the slopes 210a, 210b, 210c, 210d and 210e may have the gradient of 40~50 degrees with respect to a horizontal plane because an excessive gradient deviation may cause bright spots due to concentration of light.

Here, the gradient means a gradient with respect to a horizontal plane and the horizontal plane corresponds to a direction in which light is emitted from the light emitting device module.

To achieve the above-described reflection effect, surfaces of the slopes 210a, 210b, 210c, 210d and 210e may be coated with a reflective material, more particularly, aluminum (Al) or silver (Ag). In addition, a bottom surface of the reflective plate having the slopes 210a, 210b, 210c, 210d and 210e may be coated with aluminum or silver.

Although not illustrated, the surfaces of the slopes 210a, 210b, 210c, 210d and 210e may be provided with a pattern. The pattern may serve to scatter the light from the light emitting device module, thus enabling uniform reflection thereof.

In addition, an optical member may be provided above the reflective plate and the light emitting device module on the frame to diffuse light directed from the reflective plate. The optical member allows the light directed from the reflective plate to be uniformly transmitted toward, e.g., a liquid crystal panel of a liquid crystal display device.

The optical member may include a diffusion sheet, a prismatic sheet and a protective sheet selectively stacked one above another, or may include a micro-lens array. In this case, a plurality of optical sheets may be used, and these optical sheets may be made of a transparent resin, such as acryl resin, polyurethane resin, silicon resin or the like.

Figure 5:
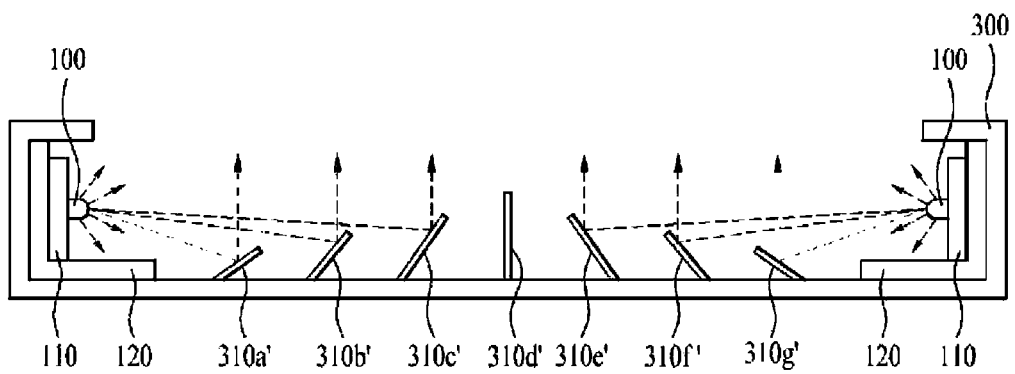
FIG. 5 is a sectional view illustrating a light emitting device module and a reflective plate of a backlight unit according to a second embodiment.
Figure 6:
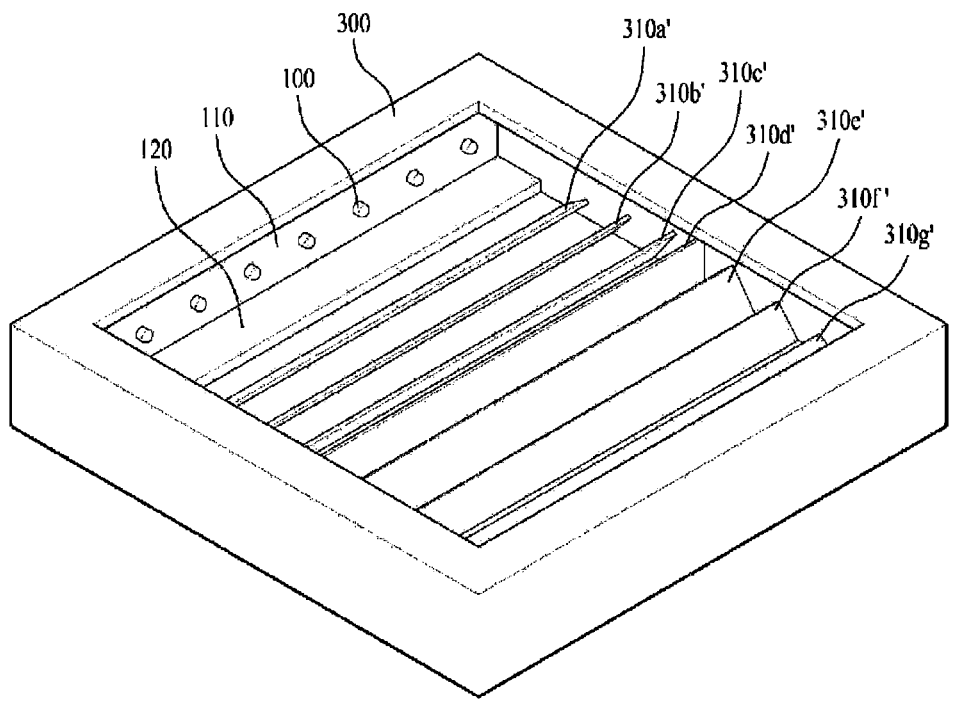
FIG. 6 is a perspective view of FIG. 5.
Figure 7:
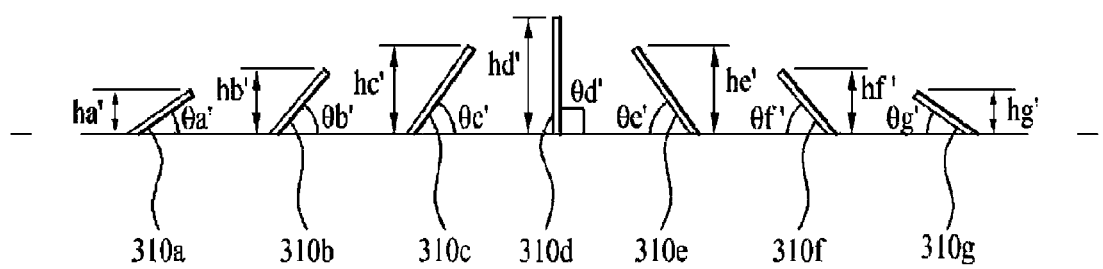
FIG. 7 is a detailed view of the reflective plate illustrated in FIG. 5.

FIG. 5 is a sectional view illustrating a light emitting device module and a reflective plate of a backlight unit according to a second embodiment, FIG. 6 is a perspective view of FIG. 5, and FIG. 7 is a detailed view of slopes illustrated in FIG. 5. Hereinafter, the backlight unit of the second embodiment will be described in detail with reference to FIGS. 5 to 7.

In the present embodiment, a pair of light emitting device modules may be provided respectively at opposite sides of a frame 300 so as to face each other, and the reflective plate may include a plurality of slopes 310a, 310b, 310c, 301d, 310e, 301f and 310g.

The plurality of slopes 310a, 310b, 310c, 301d, 310e, 301f and 310g may be symmetrically arranged on the basis of a center axis of the frame 300, i.e. a center axis between the pair of light emitting device modules. Here, the term "symmetric" means that the slopes provided at opposite sides of the center axis have symmetric heights ha, hb, hc, hd, he, hf and hg and symmetric gradients θa, θb, θc, θd, θe, θf and θg.

It should be noted that the above-described light reflection effect may be achieved even when the slopes 310a, 310b, 310c, 310d, 310e, 310f and 310g have a constant gradient. In addition, as illustrated, the gradients θa, θb, θc, θd, θe, θf and θg of the respective slopes 310a, 310b, 310c, 310d, 310e, 310f and 310g may increase with increasing distance from the light emitting device module.

The slopes 310a, 310b, 310c, 310d, 310e, 310f and 310g may increase in height with increasing distance from a closer one of the pair of light emitting device modules. In FIG. 5, the slopes 310a, 310b and 310c are closer to the left light emitting device module and thus, may increase in height with increasing distance from the left light emitting device module. On the other hand, the slopes 310e, 310f and 310g are closer to the right light emitting device module of FIG. 5 and may increase in height with increasing distance from the right light emitting device module. Accordingly, the slope 310d provided on the center axis has the greatest height.

The slopes 310a, 310b, 310c, 310d, 310e, 310f and 310g have preset gradients with respect to a horizontal plane to reflect light upward with respect to FIG. 5, i.e. toward a liquid crystal panel. Although FIG. 5 illustrates seven slopes, a greater number of slopes may actually be provided to enhance brightness and prevent bright spots due to concentration of light.

It should be noted that the above-described light reflection effect can be achieved even when the slopes 310a, 310b, 310c, 310d, 310e, 310f and 310g have a constant gradient. In addition, as illustrated, the gradients θa, θb, θc, θd, θe, θf and θg of the respective slopes 310a, 310b, 310c, 310d, 310e, 310f and 310g may increase with increasing distance from a closer one of the pair of light emitting device modules.

More specifically, as the distance from the light emitting device module increases, the quantity of light incident upon the respective slopes decreases and the slopes tend to reflect light toward the center rather than the perimeter of the panel. However, it should be noted that the slopes 310a, 310b, 310c, 310d, 310e, 310f and 310g may have the gradient of 40~50 degrees with respect to a horizontal plane because an excessive gradient deviation may cause bright spots due to concentration of light.

To achieve the above-described reflection effect, surfaces of the slopes 310a, 310b, 310c, 310d, 310e, 310f and 310g may be coated with aluminum or silver. In addition, a bottom surface of the reflective plate having the slopes 310a, 310b, 310c, 310d, 310e, 310f and 310g may be coated with aluminum or silver.

Although not illustrated, the surfaces of the slopes 310a, 310b, 310c, 310d, 310e, 310f and 310g may be provided with a pattern. The pattern may serve to scatter the light from the light emitting device module, thus enabling uniform reflection thereof.

Similarly, an optical member may be provided above the reflective plate and the light emitting device module on the frame to diffuse light directed from the reflective plate.

Figure 8:
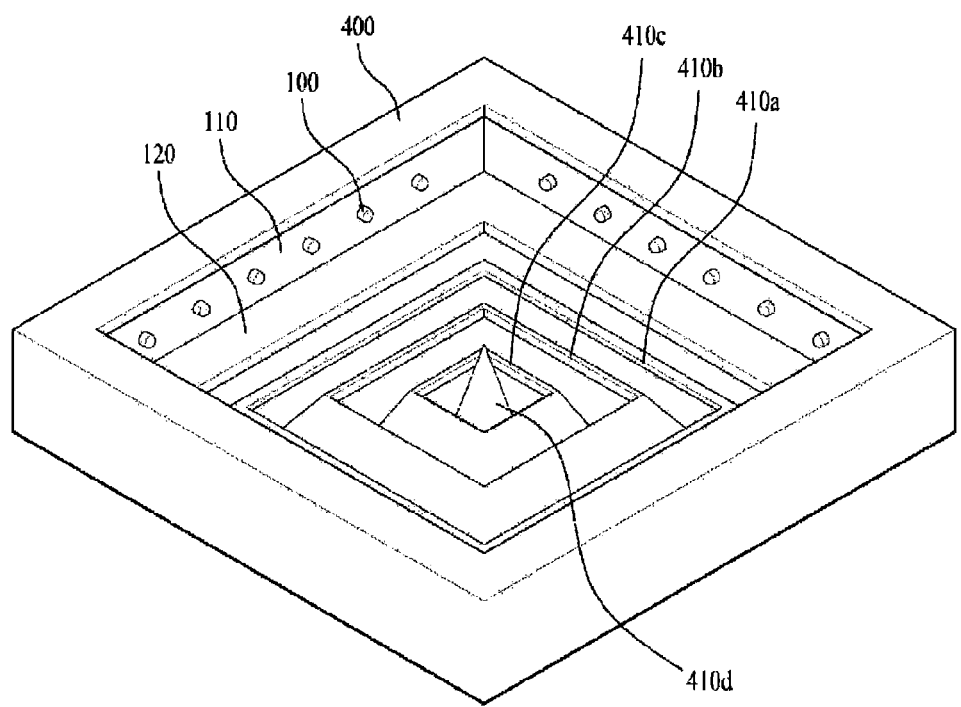
FIG. 8 is a view illustrating a light emitting source module and a reflective plate of a backlight unit according to a third embodiment.
Figure 9:
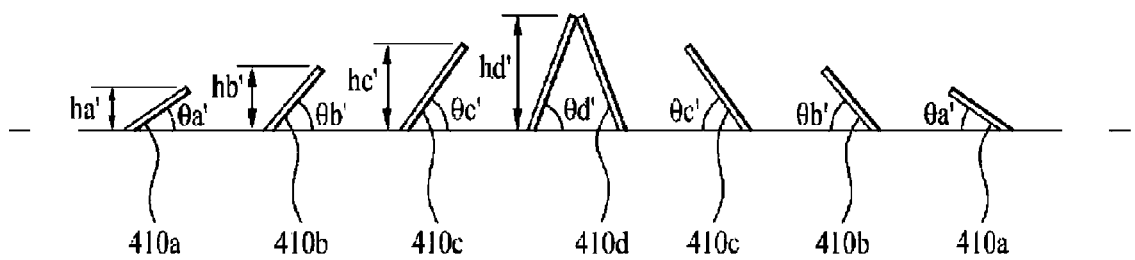
FIG. 9 is a detailed view of the reflective plate illustrated in FIG. 8.

FIG. 8 is a view illustrating a light emitting device module and a reflective plate of a backlight unit according to a third embodiment, and FIG. 9 is a detailed view of slopes illustrated in FIG. 8. Hereinafter, the backlight unit according to the third embodiment will be described in detail with reference to FIGS. 8 and 9.

In the present embodiment, light emitting device modules may be provided respectively at four sides of a frame 400 so as to face each other, and the reflective plate may include a plurality of slopes 410a, 410b, 410c and 410d.

The plurality of slopes 410a, 410b, 410c and 410d may be placed on coaxial squares having different lengths. More specifically, each slope 410a, 410b, 410c or 410d may consist of four sides, and the slopes 410a, 410b, 410c and 410d may be coaxially arranged about the center of the frame 400.

The heights ha, hb, hc and hd of the plurality of slopes 410a, 410b, 410c and 410d may increase with increasing distance from a closest one of the four light emitting device modules. That is, the slopes may increase in height and become narrower with increasing distance from a specific light emitting device module.

In addition, the slope 410d provided at the center of the frame 400 takes the form of a pyramid, i.e. a pentahedron having a square bottom and four triangular sides, the four triangular sides serving to reflect light. In this case, the apex of the pentahedron may have the greatest height.

The slopes 410a, 410b, 410c and 410d have preset gradients with respect to a horizontal plane to reflect light upward with respect to FIG. 8, i.e. toward a liquid crystal panel. Although FIG. 9 illustrates four slopes, a greater number of slopes may actually be provided to enhance brightness and prevent bright spots due to concentration of light.

It should be noted that the above-described light reflection effect can be achieved even when the slopes 410a, 410b, 410c and 410d have a constant gradient. In addition, as illustrated, the gradients θa, θb, θc, and θd of the respective slopes 410a, 410b, 410c and 410d may increase with increasing distance from a closest one of the four light emitting device modules.

More specifically, as the distance from the light emitting device module increases, the quantity of light incident upon the respective slopes decreases and the slopes tend to reflect light toward the center rather than the perimeter of the panel. However, it should be noted that the slopes 410a, 410b, 410c and 410d may have the gradient of 40~50 degrees with respect to a horizontal plane because an excessive gradient deviation may cause bright spots due to concentration of light.

Similarly, to achieve the above-described reflection effect, surfaces of the slopes 410a, 410b, 410c and 410d and a bottom surface of the reflective plate may be coated with aluminum or silver. In addition, the surfaces of the slopes 410a, 410b, 410c and 410d may be provided with a pattern. The pattern may serve to scatter the light from the light emitting device module, thus enabling uniform reflection thereof.

Similarly, an optical member may be provided above the reflective plate and the light emitting device module on the frame to diffuse light directed from the reflective plate.

Figure 10A:
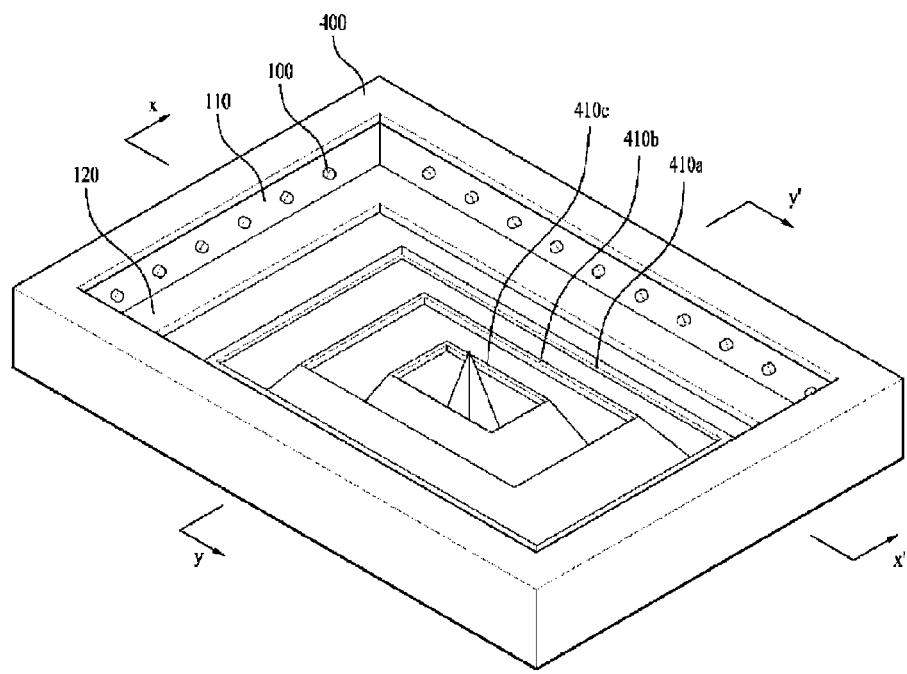
FIGS. 10A and 10B are views illustrating a light emitting device module and a reflective plate of a backlight unit according to a fourth embodiment.
Figure 10B:
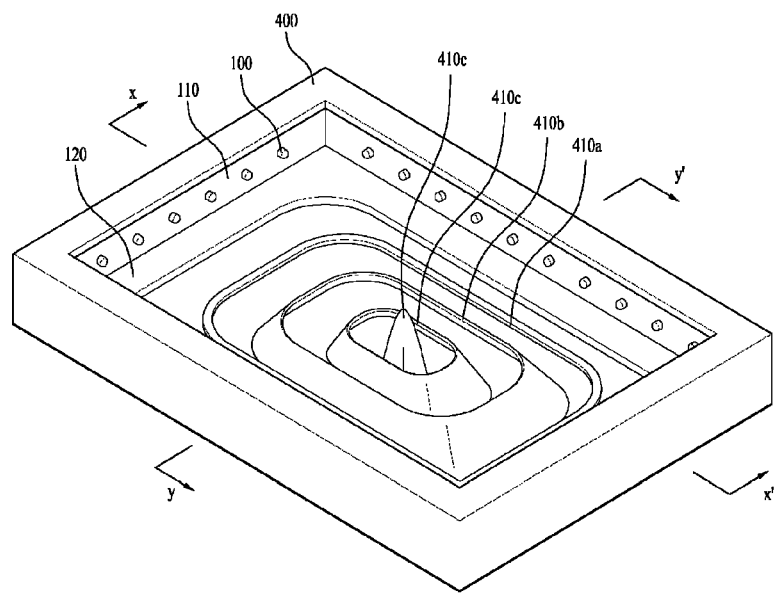
Figure 11A:
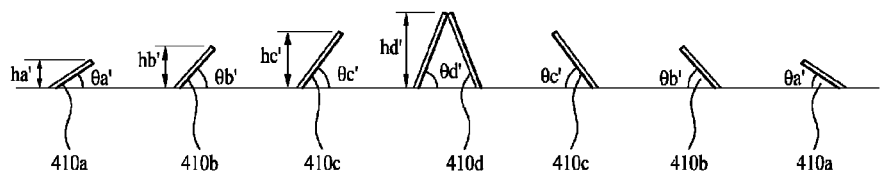
FIGS. 11A and 11B are detailed views of the reflective plate illustrated in FIGS. 10A and 10B respectively.
Figure 11B:
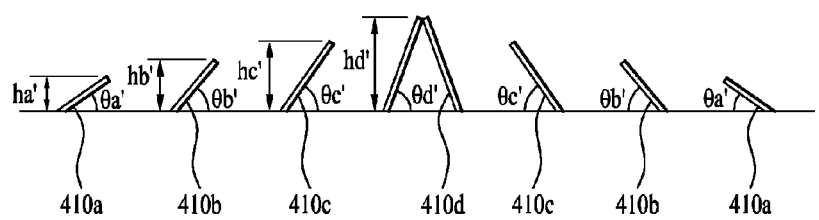

FIGS. 10A and 10B are views illustrating a light emitting device package module and a reflective plate of a backlight unit according to a fourth embodiment, and FIGS. 11A and 11B are detailed views of the reflective plate illustrated in FIGS. 10A and 10B respectively.

The backlight unit of the fourth embodiment is similar to that of the above-described third embodiment except that the backlight unit has a rectangular shape rather than a square shape. Thus, as illustrated in FIG. 10A, one pair of light emitting device modules facing each other includes a greater number of light emitting device packages 100 and the other pair of light emitting device modules includes a smaller number of light emitting device packages 100.

In the embodiment illustrated in FIG. 10B, the rectangles, on which the respective slopes 410a, 410b, 410c and 410d are placed, have rounded corners.

FIGS. 11A and 11B are respectively sectional views taken along the axes x-x' and y-y' of FIGS. 10A and 10B, illustrating the slopes in detail. As illustrated, the axis x-x' is longer than the axis y-y' and the distance between the neighboring slopes along the axis x-x' is longer than along the axis y-y'.

Figure 12:
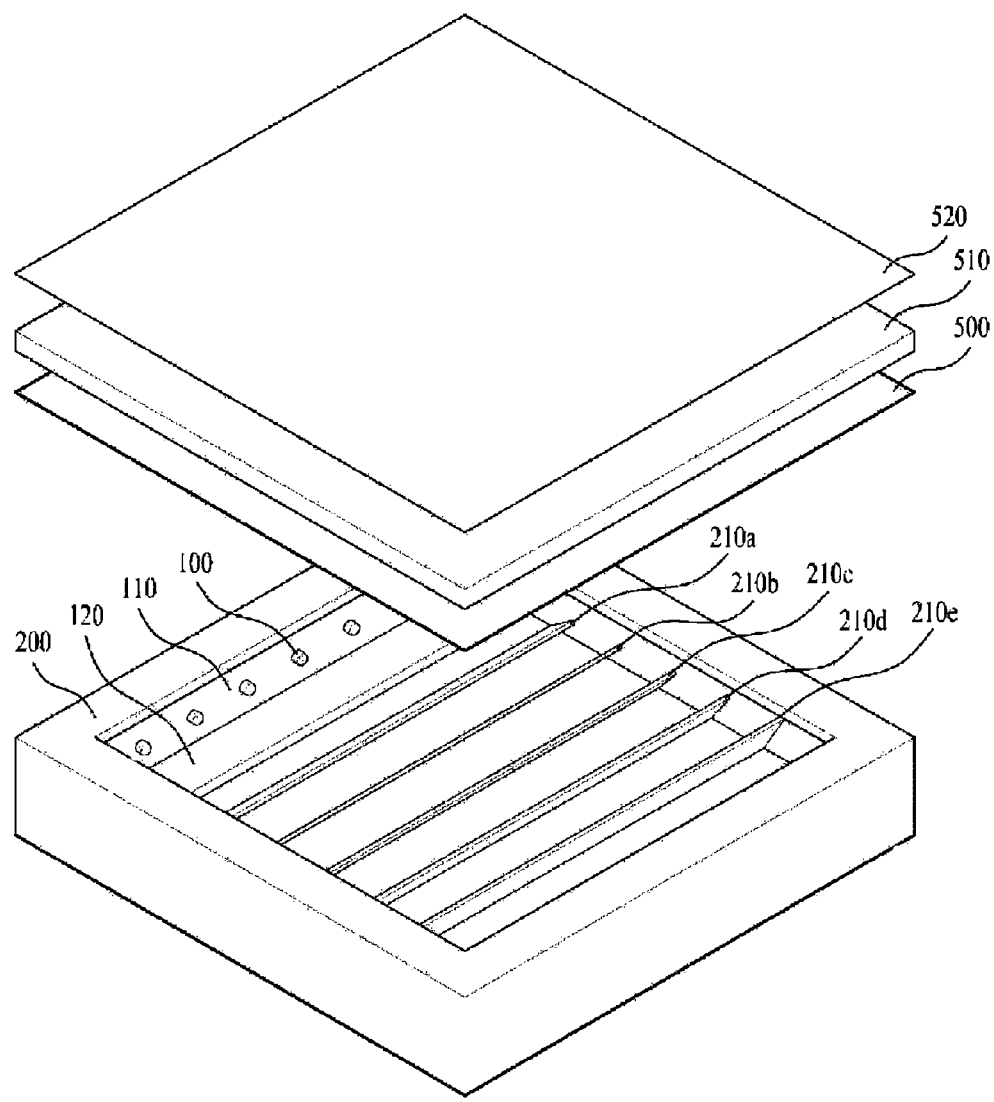
FIG. 12 is a perspective view illustrating an embodiment of a display device.

FIG. 12 is a perspective view illustrating an embodiment of a display device. Hereinafter, the display device according to the present embodiment will be described with reference to FIG. 12.

Referring to FIG. 12, the reflective plate may be provided above the frame 200 to change the path of light emitted from the light emitting device module and may include the plurality of slopes 210a, 210b, 210c, 210d and 210e. The light emitting device module is attached to at least one side surface of the frame 200. To this end, the printed circuit board 110, on which the light emitting device module, i.e. an array of the light emitting device packages 100 is mounted, may be bonded to the first surface of the bracket 120.

In addition to the light emitting device module bonded to the side surface of the frame 200, although not illustrated, a heat transfer member may be provided on the frame 200 so as to come into contact with the bracket 120.

The reflective plate serves to reflect/scatter light emitted from the light emitting device module, thereby allowing the light to be uniformly distributed throughout a screen of the liquid crystal display device. A detailed configuration of the reflective plate is equal to that described above. The reflective plate may be configured to reflect light emitted form two edge type or four edge type light emitting device modules as well as the single edge type light emitting device module illustrated in FIG. 12.

The single edge type light emitting device module is arranged in a single line form, and the two edge type light emitting device module includes a pair of light emitting device package arrays facing each other.

In addition, an optical member 500 is provided above the reflective plate and serves to diffuse light directed from the reflective plate by a predetermined angle. The optical member 500 allows the light directed from the reflective plate to be uniformly transmitted to a liquid crystal panel 510 of the display device.

In this case, a light guide plate (not shown) is provided between the reflective plate and the optical member 500 and serves to guide the light reflected from the reflective plate toward the optical member 500.

The optical member may include a diffusion sheet, a prismatic sheet and a protective sheet selectively stacked one above another, or may include a micro-lens array. In this case, a plurality of optical sheets may be used, and these optical sheets may be made of a transparent resin, such as acryl resin, polyurethane resin, silicon resin or the like.

The liquid crystal panel 510 of the liquid crystal display device is configured such that liquid crystals are filled between glass substrates and a pair of polarizing plates is placed respectively on the glass substrates. Here, the liquid crystals are regularly arranged organic molecules having properties between solid and liquid and thus, having fluidity. The molecular arrangement of liquid crystals is changed by an exterior electric field, enabling display of an image.

The liquid crystal panel 510 used in the display device is of an active matrix type and includes transistors serving as switches to control application of voltage to each pixel.

A color filter 520 is placed on a front surface of the liquid crystal panel 510. The color filter 520 serves to display an image in such a manner that each pixel acts to transmit only red, blue or green light projected from the liquid crystal panel 510.

In the display device having the above-described configuration, the light guide plate may be omitted, which results in a considerable reduction in the weight and thickness of the display device. Further, as a result of the slopes of the reflective plate acting to uniformly reflect light throughout the liquid crystal panel, it is possible to prevent uneven brightness distribution and bright spots due to concentration of light.

As is apparent from the above description, the display device can exhibit an extremely slim design and higher brightness.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
a light emitting device module;
a reflective plate including at least two slopes configured to reflect light emitted from the light emitting device module to an optical member; and
the optical member configured to transmit the light directed from the light emitting device module and the reflective plate,
wherein a slope located farther from the light emitting device module among the at least two slopes has a greater gradient with respect to a horizontal plane than that of a slope located closer to the light emitting device module among the at least two slopes, and
wherein each of the at least two slopes is provided at a surface thereof with a pattern to scatter light from the light emitting device module.

2. The backlight unit according to claim 1, wherein the light emitting device module is arranged in a single line form.

3. The backlight unit according to claim 1, wherein the gradients of the respective slopes with respect to the horizontal plane increase with increasing distance from the light emitting device module.

4. The backlight unit according to claim 1, wherein a slope located farthest from the light emitting device module among the at least two slopes has a greater height than a slope located closest to the light emitting device module among the at least two slopes.

5. The backlight unit according to claim 4, wherein the heights of the respective slopes increase with increasing distance from the light emitting device module.

6. The backlight unit according to claim 1, wherein the light emitting device module includes a pair of light emitting device arrays facing each other.

7. The backlight unit according to claim 6, wherein the at least two slopes are symmetrical with respect to a center axis between the pair of light emitting device arrays.

8. The backlight unit according to claim 1, wherein the gradients of the slopes are in a range of 40 to 50 degrees with respect to the horizontal plane.

9. The backlight unit according to claim 1, wherein a reflective material is formed to surfaces of the slopes.

10. The backlight unit according to claim 9, wherein the reflective material is aluminum or silver.

11. The backlight unit according to claim 1, wherein aluminum or silver is formed to a bottom surface of the reflective plate including the slopes.

12. The backlight unit according to claim 1, further comprising a light guide plate to guide the light reflected from the reflective plate.

13. A backlight unit, comprising:
four edge type light emitting device modules; and
a reflective plate configured to reflect light emitted from the light emitting device modules,
wherein the reflective plate includes at least two slopes placed respectively on coaxial rectangles having different lengths, and
wherein each of the at least two slopes is provided at a surface thereof with a pattern to scatter light from the light emitting device module.

14. The backlight unit according to claim 13, wherein the rectangles have rounded corners.

15. The backlight unit according to claim 13, wherein the slopes increase in height with increasing distance from a closest one of the four light emitting device modules.

16. The backlight unit according to claim 13, wherein the slopes increase in gradient with respect to the horizontal plane with increasing distance from a closest one of the four light emitting device modules.

17. The backlight unit according to claim 13, further comprising a light guide plate to guide the light directed from the reflective plate.

18. A display device, comprising:
a backlight unit comprising:
a light emitting device module;
a reflective plate configured to reflect light emitted from the light emitting device module; and
a frame in which the light emitting device module and the reflective plate are received,
wherein the reflective plate has at least two slopes,
wherein a slope located farther from the light emitting device module among the at least two slopes has a greater gradient with respect to a horizontal plane than that of a slope located closer to the light emitting device module among the at least two slopes, and
wherein each of the at least two slopes is provided at a surface thereof with a pattern to scatter light from the light emitting device module;
a light guide plate configured to transmit the light directed from the backlight unit to a panel; and
the panel placed on the light guide plate and serving to form an image upon receiving the transmitted light.

19. The display device according to claim 18, wherein the light emitting device module includes a pair of light emitting device arrays facing each other, and the at least two slopes are symmetrical with respect to a center axis between the pair of light emitting device arrays.

20. The backlight unit according to claim 6, wherein a slope provided on a center axis between the pair of light emitting device arrays has a greatest height among the at least two slopes.

* * * * *